United States Patent
Schmit et al.

(10) Patent No.: US 9,300,707 B2
(45) Date of Patent: Mar. 29, 2016

(54) SYSTEM AND METHOD OF MONITORING, CONTROL AND CONFIGURATION OF SECURITY AND LIFESTYLE DEVICES

(71) Applicant: HONEYWELL INTERNATIONAL INC., Morristown, NJ (US)

(72) Inventors: Thomas Paul Schmit, Huntington, NY (US); James W. Kern, East Islip, NY (US); Philip J. Ferro, Setauket, NY (US); William R. Blum, Huntington Station, NY (US)

(73) Assignee: HONEYWELL INERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/692,444

(22) Filed: Apr. 21, 2015

(65) Prior Publication Data

US 2015/0229682 A1  Aug. 13, 2015

Related U.S. Application Data

(63) Continuation of application No. 13/712,702, filed on Dec. 12, 2012, now Pat. No. 9,055,125.

(60) Provisional application No. 61/569,858, filed on Dec. 13, 2011.

(51) Int. Cl.

| | |
|---|---|
| *G06F 15/16* | (2006.01) |
| *H04L 29/06* | (2006.01) |
| *H04L 29/08* | (2006.01) |
| *H04L 12/24* | (2006.01) |
| *H04L 12/58* | (2006.01) |

(52) U.S. Cl.
CPC .......... *H04L 65/403* (2013.01); *H04L 41/0803* (2013.01); *H04L 51/32* (2013.01); *H04L 67/10* (2013.01); *H04L 67/12* (2013.01)

(58) Field of Classification Search
CPC ................................................ G06Q 30/0281
USPC ....................................................... 709/204
See application file for complete search history.

(56) References Cited

U.S. PATENT DOCUMENTS

| | | | | |
|---|---|---|---|---|
| 2009/0129301 | A1* | 5/2009 | Belimpasakis | H04W 28/18 370/310 |
| 2009/0195407 | A1* | 8/2009 | Nakano | H04N 5/4403 340/12.23 |
| 2009/0327931 | A1* | 12/2009 | Bonuso | G06F 8/10 715/763 |
| 2010/0197364 | A1* | 8/2010 | Lee | H04M 1/72533 455/572 |
| 2011/0045842 | A1* | 2/2011 | Rork | H04L 12/5865 455/456.1 |
| 2011/0047581 | A1* | 2/2011 | Caspi | H04L 12/66 725/80 |
| 2012/0066301 | A1* | 3/2012 | Holland | H04L 67/12 709/204 |
| 2012/0080949 | A1* | 4/2012 | Gelonese | H02J 3/14 307/31 |
| 2012/0094595 | A1* | 4/2012 | Nakano | G08C 17/00 455/39 |
| 2012/0131158 | A1 | 5/2012 | Winters et al. | |
| 2012/0265528 | A1* | 10/2012 | Gruber | G10L 15/18 704/235 |
| 2012/0310820 | A1 | 12/2012 | Carter | |
| 2012/0310899 | A1 | 12/2012 | Wasserman et al. | |
| 2012/0316984 | A1* | 12/2012 | Glassman | G06Q 50/06 705/26.7 |
| 2013/0041951 | A1* | 2/2013 | Lee | G05B 15/02 709/204 |
| 2013/0091208 | A1* | 4/2013 | Rajakaruna-nayake | H04L 67/306 709/204 |
| 2013/0091213 | A1* | 4/2013 | Diab | G06Q 50/01 709/204 |

\* cited by examiner

*Primary Examiner* — Hamza Algibhah
(74) *Attorney, Agent, or Firm* — Huch Blackwell LLP

(57) ABSTRACT

A social networking site that communicates with a plurality of human users can also communicate with a plurality of non-human users. Information from one of the non-human users can be automatically received at the site and evaluated. Commands can be automatically transmitted to another of the non-human users in response to the evaluation. A human readable indicator can be posted at a page of the site.

17 Claims, 2 Drawing Sheets

SYSTEM AND METHOD OF MONITORING, CONTROL AND CONFIGURATION OF SECURITY AND LIFESTYLE DEVICES

CROSS-REFERENCE TO RELATED APPLICATION

This application is a continuation of co-pending U.S. patent application Ser. No. 13/712,702 filed Dec. 12, 2012 and entitled "System and Method of Monitoring, Control and Configuration of Security and Lifestyle Devices," which claims the benefit of the filing date of U.S. Provisional Application Ser. No. 61/569,858 filed Dec. 13, 2011 and entitled "System and Method of Monitoring, Control and Configuration of Security and Lifestyle Devices." The disclosures of these applications are fully incorporated herein by reference.

FIELD

The application pertains to Internet enabled systems and methods of monitoring and controlling security and lifestyle devices. More particularly, the application pertains to such systems and methods which incorporate functionality of social networking services to automatically implement control of and communications with displaced monitoring systems and associated devices.

BACKGROUND

Emerging Internet based social networking services and related tools, such as Twitter (www.twitter.com) and Facebook (www.facebook.com), allow anyone to combine data and/or information from many sources to be displayed in a centralized portal and in a personalized way. Internet users are looking more and more to use these services to aggregate and display/edit information about conditions and physical devices that are important to them. It follows then that it would be useful to have access to security and lifestyle related information, via these portals.

DETAILED DESCRIPTION

Figure 1:
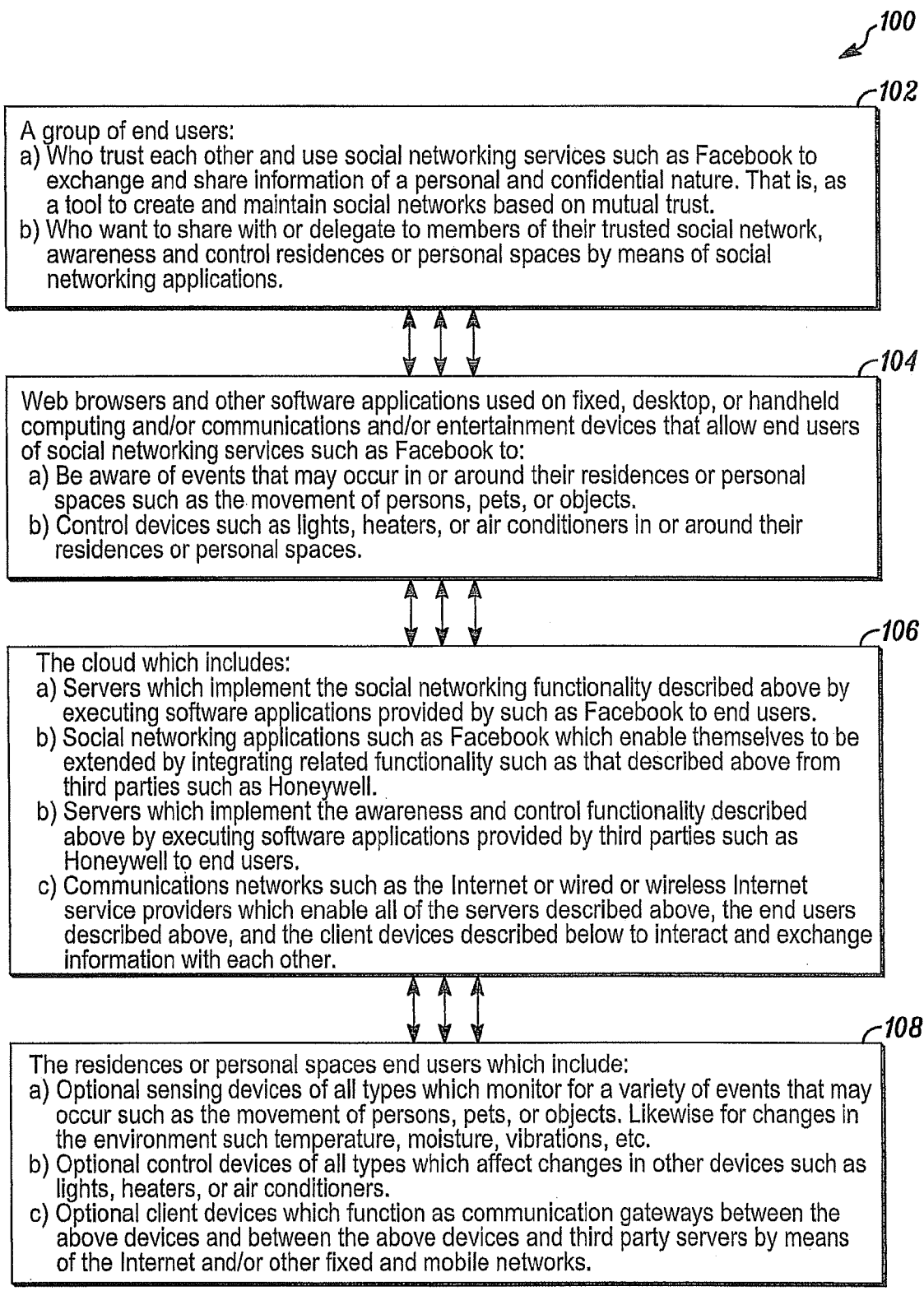
FIG. 1 illustrates a block diagram in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

Embodiments hereof provide systems and physical devices, both at the user's location (clients) and within the cloud (servers) that facilitate the integration of the monitoring, control, and configuration of clients and servers with the networking services and tools cited above by both the individual users and providers of these services and tools. The provided information would include, but not be limited to status/commands exchanged with clients such as configuration data, event descriptions, email, text messaging via chat and SMS, audio recording clips, photos and/or video clips.

Social networking services provide proprietary API's (application programmer interfaces) and other tools to facilitate integration with their services. For example, Facebook provides documentation related to the above at developer.facebook.com. Disclosed embodiments include the client devices at the users' location including any of hardware, software, communications/networking protocols, user facing aspects, etc. that use and communicate with the proprietary services and tools cited above. In yet another aspect, embodiments include cloud based services that may be used to facilitate usage and communication between the above client and the proprietary services and tools cited above also including any of hardware, software, communications/networking protocols, user facing aspects, all without limitation.

With respect to FIG. 1, and block diagram 100, one exemplary embodiment includes END USERS, as at 102:

a) Who TRUST each other and use SOCIAL NETWORKING APPLICATIONS such as Facebook to exchange and share information of a personal and confidential nature, that is, as a tool to create and maintain SOCIAL NETWORKS BASED ON MUTUAL TRUST.

b) Who want to be AWARE of events that may occur in or around their RESIDENCES or PERSONAL SPACES such as the movement of persons, pets, or objects, as at 104.

c) Who may also want to CONTROL devices such as lights, heaters, or air conditioners in or around their RESIDENCES or PERSONAL SPACES.

d) Who want to SHARE WITH or DELEGATE TO members of their trusted social network, the AWARENESS and CONTROL described above by means of social networking applications.

The SOCIAL NETWORKING APPLICATIONS such as Facebook which may enable themselves to be extended by integrating related functionality such as that described above from third parties.

The exemplary embodiment also includes the CLOUD which includes, as at 106:

a) SERVERS which implement the SOCIAL NETWORKING functionality described above by executing software applications provided by SOCIAL NETWORKING APPLICATIONS such as Facebook to END USERS.

b) SERVERS which implement the AWARENESS and CONTROL functionality described above by executing software applications provided by third parties to END USERS.

c) COMMUNICATIONS NETWORKS such as the Internet or wired or wireless Internet service providers which enable all of the SERVERS described above, the END USERS described above, and the CLIENT DEVICES described below to interact and exchange information with each other.

The exemplary embodiment also includes END USERS' RESIDENCES or PERSONAL SPACES which include, as at 108:

a) Optional SENSING DEVICES of all types which monitor for a variety of events that may occur such as the movement of persons, pets, or objects. Likewise, the SENSING DEVICES monitor for changes in the environment such as temperature, moisture, vibrations, etc.

b) Optional CONTROL DEVICES of all types which affect changes in other devices such as lights, heaters, or air conditioners.

c) CLIENT DEVICES which function as a communication gateway between the above devices and between the above devices and the SERVERS in the CLOUD as described above.

The exemplary embodiment also includes END USER INTERFACE DEVICES which enable the end user to interact with the system described above which include:

a) WEB BROWSERS such as Firefox or Internet Explorer.
b) Software applications specific to fixed, desktop, or handheld computing and/or communications and/or entertainment devices which are connected to the CLOUD.

In yet another aspect, the awareness and control functionality which would be provided by a third party should be perceived by the end users as another user of the social networking application (provided by a service such as Facebook).

For example, although Facebook provides significant page area within the application part of their site for use by third party applications, it can be expected that most of the interaction between the end users and third party applications will take the form of text messages exchanged between such applications and the end users. On Facebook these types of exchanges occur mostly within the 'News Feed' and 'Messages' parts of the Facebook site. In yet another embodiment, third party applications can incorporate software technology to interpret and respond to end users using phrases that are as near as possible to natural human text exchanges in this type of context.

In another aspect, third party functionality posts within the 'Photos' part of the Facebook site visual/audio content would relate to the awareness and control functionality.

Figure 2:
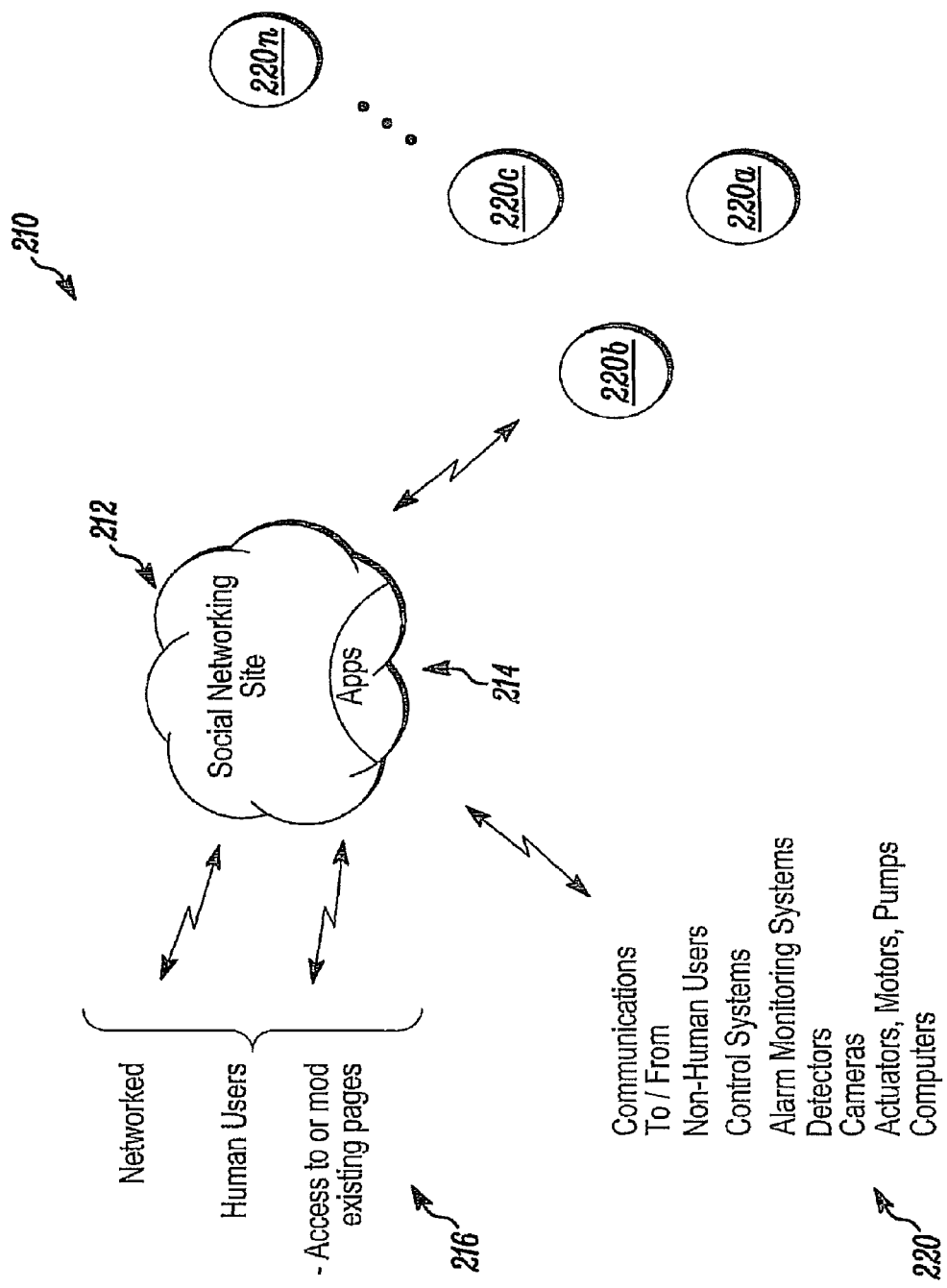
FIG. 2 illustrates additional aspects of the diagram of FIG. 1.

FIG. 2 illustrates a combination 210 in accordance herewith. FIG. 2 illustrates a social networking site 212 which could be implemented as is the case with Twitter.com or Facebook.com. A plurality of different apps 214 can provide specific additional functionality as would be understood by those of skill in the art to registered human users 216 of the site 212. Such services can include, accessing or modifying existing pages all without limitation.

Unlike the human-to-human types of communications supported by networking sites, such as site 212, combination 210 provides access and enables communications at site 212 with a plurality of different non-human communicators, such as systems, devices, or machines, generally indicated at 220.

Non-human information providing communicators of a type that might access and communicate with site 212 include, without limitation, control systems, monitoring systems of all types including security systems, temperature and air quality monitoring systems, fire alarm systems, gas monitoring systems, and the like all without limitation, indicated generally at 220a, b, . . . n.

It will be understood that the non-human communicators can present information at the "Messages" and "News Feed" portions of a respective page of the networking site 212 for the benefit of human monitors. In addition however, using prestored apps, such as at 214, as well as at respective devices or systems, such non-human communicators can evaluate information provided by one of them, for example a control system, such as 220a, and determine that one or more operational settings needs to be changed. Responsive thereto, in addition to potentially providing a human readable message or alarm, at the respective page, one or more commands can be transmitted to a respective detector, sensor, or camera for more information. Further, instructions can be automatically transmitted to one or more actuators, motors, pumps or displaced control computers such as 220i. Those output devices, such as 220i can in turn respond to the site 212 and the associated page with confirmatory information as to their response to the instructions.

In another exemplary embodiment, the elements 220i could correspond to person carried IP enabled GPS positioning systems. In this embodiment the elements 220i could be provided to volunteers canvassing prospective voters, making requests for charitable donations or the like. The respective page at the networking site 212 can not only provide, or display, information to a person working with the volunteers, but, information can be automatically forwarded to the respective elements 220i providing directions to the volunteers as to regions to move into for further activities.

In yet another configuration, the elements 220i can be carried by each member of a plurality of mobile devices, such as boats, motorcycles, cars or the like which might be participating in some activity, such as a tour or race. The elements 220i can forward status information as to the location, or condition of the participating mobile devices to a pre-established page of the networking site 212 for presentation to a monitor of the activity. A local app at the site 212 can process that information and automatically forward updated routing information to the plurality of mobile devices. This configuration could also automatically provide updated weather information and be used with wilderness hiking, or mountain climbing.

Businesses could use configurations, such as 210, to automatically and on an on-going basis, keep track of fleets of vehicles. Local traffic conditions or location information can automatically be provided to a dispatcher monitoring a page of the networking site 212. Business requests, for example a request for taxi service or a delivery, could be formatted and automatically forwarded to one or more of the vehicles.

In summary, the use of networking sites, such as site 212, can cost effectively provide a platform which can be used to interact automatically with a wide variety of remote devices or elements. For purposes of this application, references to non-human communicators refer to devices, systems, detectors, actuators, computers or the like, without limitation, which do not need human intervention to initiate, or respond to communications with/from a social networking site, or service. An individual or organization enrolled at a social networking site, such as site 212, can benefit from such intermittent connectivity without having to invest resources in the creating or maintaining of their own, personal, platform.

As those of skill will understand, information presented at site 212 originating from the displaced elements or devices 220i, as a result for example of one or more third party apps executing at site 212, could be presented and perceived by respective end users viewing the respective Facebook page as being from, or associated with, another user of the respective social networking application.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. An apparatus comprising:
   a computer networking site that facilitates at least one of visual or audible communications between at least some of the site users; and
   a plurality of non-human users selected from a class that includes at least control systems, monitoring systems, detectors, sensors, cameras, computers, actuators, motors and pumps,
   wherein, at least one member of the plurality initiates communications with another member of the plurality as a result of a presence of a selected condition through a respective page of the computer networking site,
   wherein the computer networking site automatically forwards the communications to the another member, and, responsive thereto the another member transmits a communication to the site which presents the communication as a human perceptible visual or audible communication from another user.

2. An apparatus as in claim 1 wherein an end user, in response to having received the human perceptible communication can initiate, via the site, a command to a member of the plurality to initiate a predetermined function.

3. An apparatus as in claim 1 which includes circuitry and executable instructions to receive and evaluate information from one of the non-human users, and transmit commands in response thereto to a same, or, a different one of the non-human user.

4. An apparatus as in claim 3 where the members of the plurality of non-human users are substantially identical.

5. An apparatus as in claim 2 wherein the site includes and executes at least one respective third party app associated with the non-human users, and wherein, responsive to a functionality of the app, respective non-human users are perceived by human site users as another user of the site.

6. An apparatus as in claim 5 wherein communications from members of the plurality, responsive to the functionality of the app, can be presented to other users as text messages.

7. An apparatus as in claim 6 wherein the text messages can be presented within predetermined message related regions of a user's display.

8. A method comprising:
   providing a social networking service; and
   providing a plurality of non-human users of communication devices,
   wherein responsive to at least one predetermined condition, at least one of the non-human users of the devices automatically communicates with a predetermined page of the networking service, and instructions are automatically forwarded, by the service, to at least one other member of the plurality,
   wherein the non-human users of the communication devices are each perceived as another human user of the social networking service, and
   wherein the automatically forwarded instructions are presented as a human readable message on a pre-established page of the networking service for the benefit of a human monitor of the communication devices.

9. A method as in claim 8 which includes providing an app for communicating with the non-human users of the communications devices, and, presenting at least portions of communications with the non-human users of the communications devices on a visual display in a form similar to communications from a human user.

10. A method as in claim 9 wherein presenting includes presenting the communications in a form of text messages.

11. A method as in claim 9 which includes providing an app and responding to end users with human text-type phrases.

12. A method as in claim 10 which includes having one member of the plurality evaluate information provided by another member of the plurality and determining that one or more commands should be transmitted to a member of the plurality.

13. A method as in claim 12 including the member of the plurality providing confirmatory information as to responding to the one or more commands.

14. A system comprising:
   a computer networking site that facilitates at least one of visual or audible communications between at least some site users; and
   a plurality of elements, some of the elements each comprise a position identifying system and function as non-human users that provide location specifying information to a respective page of the site,
   wherein the computer networking site automatically forwards the location specifying information to another non-human element of the plurality of elements,
   wherein the site, in addition, presents the location specifying information in a visual or audible format on a pre-established page of the site accessible by human users, and wherein the location specifying information is sent from the site to a human user associated with a non-human user that provided the location specifying information.

15. A system as in claim 14 wherein the non-human user can provide predetermined types of status information to the site for monitoring and wherein the site can provide updated information to the human user.

16. A system as in claim 15 wherein one of the users comprises a monitoring site wherein conditions and locations of members of a fleet of vehicles can be visually or audible presented.

17. A system as in claim 16 wherein requests for services can be formatted and automatically forwarded to users of selected members of the fleet.

* * * * *